(12) United States Patent
Birkeland

(10) Patent No.: US 10,913,516 B2
(45) Date of Patent: Feb. 9, 2021

(54) APPARATUS AND METHOD FOR CUTTING A LINE EXTENDING FROM A FLOATING VESSEL

(71) Applicant: Smart Installations AS, Tananger (NO)

(72) Inventor: Petter Birkeland, Tananger (NO)

(73) Assignee: Smart Installations AS, Tananger (NO)

( * ) Notice: Subject to any disclaimer, the term of this patent is extended or adjusted under 35 U.S.C. 154(b) by 0 days.

(21) Appl. No.: 16/628,349

(22) PCT Filed: Jun. 14, 2018

(86) PCT No.: PCT/NO2018/050155
§ 371 (c)(1),
(2) Date: Jan. 3, 2020

(87) PCT Pub. No.: WO2019/009731
PCT Pub. Date: Jan. 10, 2019

(65) Prior Publication Data
US 2020/0148309 A1    May 14, 2020

(30) Foreign Application Priority Data

Jul. 6, 2017 (NO) .................................. 20171117

(51) Int. Cl.
*B63B 21/56* (2006.01)
*B23D 15/04* (2006.01)
(52) U.S. Cl.
CPC .............. *B63B 21/56* (2013.01); *B23D 15/04* (2013.01)

(58) Field of Classification Search
CPC ........... B63B 9/00; B63B 21/00; B63B 21/18; B63B 21/22; B63B 21/56; B63B 21/60; B23D 15/00; B23D 15/04
(Continued)

(56) References Cited

U.S. PATENT DOCUMENTS 8,714,062 B2 * 5/2014 Birkeland ............... B63B 21/18
114/221 A

FOREIGN PATENT DOCUMENTS

| CN | 202541785 | 11/2012 |
|---|---|---|
| CN | 103224006 | 7/2013 |

(Continued)

OTHER PUBLICATIONS

Norwegian Search Report for NO20171117, dated Feb. 6, 2018.
(Continued)

*Primary Examiner* — Lars A Olson
(74) *Attorney, Agent, or Firm* — Andrus Intellectual Property Law, LLP

(57) ABSTRACT

An apparatus is for cutting a line extending from a floating vessel having a deck. The apparatus includes: two guide pins configured to move between a retracted position and an extended position, wherein a distance between the guide pins, in an extended position, is spanned by a spacer, the spacer forming a reaction surface; a cutting device mounted between the two guide pins, the cutting device being configured to move between a retracted position and an extended position; wherein the cutting device is arranged to perform a direct cut of the line against the reaction surface without holding the line prior to cutting such that the line may be cut directly independently of the orientation of the line.

11 Claims, 3 Drawing Sheets

(58) Field of Classification Search
USPC ............... 114/221 A, 221 R; 83/13, 461
See application file for complete search history.

(56) References Cited

FOREIGN PATENT DOCUMENTS

| NO | 20141024 | 2/2016 |
|----|----------|--------|
| WO | 2010024684 | 3/2010 |
| WO | 2013051941 | 4/2013 |
| WO | 2013165257 | 11/2013 |

OTHER PUBLICATIONS

International Search Report and the Written Opinion for PCT/NO2018/050155, dated Aug. 14, 2018.
Reply to the Written Opinion for PCT/NO2018/050155, dated Nov. 13, 2018.
Written Opinion for PCT/NO2018/050155, dated May 22, 2019.
International Preliminary Report on Patentability for PCT/NO2018/050155, dated Sep. 24, 2019.

\* cited by examiner

APPARATUS AND METHOD FOR CUTTING A LINE EXTENDING FROM A FLOATING VESSEL

CROSS-REFERENCE TO RELATED APPLICATIONS

This application is the U.S. national stage application of International Application PCT/NO2018/050155, filed Jun. 14, 2018, which international application was published on Jan. 10, 2019, as International Publication WO 2019/009731 in the English language. The International Application claims priority of Norwegian Patent Application No. 20171117, filed Jul. 6, 2017. The international application and Norwegian application are both incorporated herein by reference, in entirety.

FIELD

The invention relates to an apparatus for cutting a line extending from a floating vessel. The invention also relates to a method for cutting a line extending from a floating vessel.

BACKGROUND

The invention has its background in floating vessels handling large loads, for example during towing, anchoring, trawling or seismic surveys. During such operations, a load may become unwieldy, for example under bad weather conditions. To avoid damage to personnel or vessel it can be desirable to release the load by cutting the line. The vessel may for example be a boat or a floating installation. A boat may for example be a service vessel, a tug, a seismic ship or a trawler, while the floating installation may for example be a drill ship or a drill rig.

The invention is especially relevant for a service vessel which often is involved in tow and anchoring of floating installations at sea. These operations involve high loads and unforeseen events with tragic outcomes, e.g. vessel sinking and/or fatalities, might occur. During an anchoring operation, the vessel will typically have a line, for example a wire, fibre rope or chain, running along the deck and over the stern. The upper end of the line is typically connected to a winch on the vessel and the lower end is connected to an anchor. The vessel can drag the anchor along the seabed for it to dig down into the soil. It is not uncommon that the load exceeds several hundred tons. If the line shifts towards one side of the ship, it might list the vessel to such a degree that it capsizes.

Patent document WO2013165257 discloses a device for cutting a towline, the device comprising at least two moveable tow pins and a lower stopper. The distance between the tow pins is, in an active position, spanned by a bridge. This is achieved by rotating the tow pins about their vertical axis, each tow pin comprising a part of the bridge, such that the two bridging parts forms a complete bridge. The lower stopper is arranged to hold the line, typically a horizontal connection link, e.g. a chain link. The lower stopper comprises a cutter which is arranged to cut the line when the line is held between the bridge and the lower stopper. The cutter is operable with the lower stopper and driven by the same actuator as the lower stopper. To engage the cutter, the lower stopper is pressed against the line with a force that exceeds the break strength of a shear bolt holding the cutter in place. When the shear bolt is broken, the cutter is free to move relative to the lower stopper and thus cut the line.

In towline cutting devices according to the prior art, cutting of a line is achieved by first engaging a lower stopper to hold a horizontal connection link between a bridge spanning two guide pins and the lower stopper itself. By applying a further force on the lower stopper, a cutter is engaged to cut the line. In an emergency, this is very impractical as the cut should be performed as fast as possible to reduce the risk of damages to the vessel and/or fatalities.

A further challenge with towline cutting devices according to the prior art, including those with a lower stopper, is that the device is only arranged to hold a horizontal connection link. If, in a situation where cutting is required, a vertical connection link is positioned between the lower stopper and the bridge, the device cannot hold the line and thus not cut the line. The line would have to be hauled in or paid out to align a horizontal link between the lower stopper and the bridge.

A third challenge with towline cutting devices according to the prior art, including those mentioned above, is that the guide pins must be rotated to form the bridge spanning the distance between the two guide pins. The system becomes more complex, with more moving parts, and thus more susceptible to malfunction.

SUMMARY

It is an object of the invention to provide an apparatus in which the required time to cut a line is reduced. It is also an object of the invention to provide an apparatus which can cut a connection link independently of its orientation. It is a further object of the invention to provide an apparatus with minimal moving parts to form an enclosure around a line.

The invention has for its object to remedy or to reduce at least one of the drawbacks of the prior art, or at least provide a useful alternative to prior art.

The object is achieved through features, which are specified in the description below and in the claims, that follow.

The invention is defined by the independent patent claims. The dependent claims define advantageous embodiments of the invention.

In a first aspect the invention relates more particularly to an apparatus for cutting a line extending from a floating vessel having a deck, the apparatus comprising:
  two guide pins configured to move between a retracted position and an extended position, wherein a distance between the guide pins, in an extended position, is spanned by a spacer, the spacer forming a reaction surface;
  a cutting device mounted between the two guide pins, the cutting device being configured to move between a retracted position and an extended position;
  wherein the cutting device is arranged to perform a direct cut of the line against the reaction surface.

The invention solves the above-mentioned challenges by combining two moveable guide pins, a spacer and a cutting device. In one embodiment the guide pins, the spacer and the cutting device, in a retracted position may be placed within a space under the deck. The spacer may be arranged on an upper portion of one or both guide pins. With the guide pins in an extended position, the guide pins, the spacer and the deck may form an enclosure around a line. A line may for example be a wire, a chain or a fibre rope. With the guide pins in an extended position, the spacer will span the distance between the two guide pins. The spacer may form a reaction surface for the cutting device to cut a line against. The reaction surface is arranged to exert a counter force on the line opposite to cutting device. When cutting, the cutting device will press the line against the reaction surface, thus the reaction surface may weaken the strength of the line. The reaction surface may have a rounded or pointed edge that will press into the line to further weaken the strength of the line, which may ease the cutting. The cutting device may be configured to move by an actuator, for example a hydraulic cylinder or a motor. The cutting device does not require the line to be held prior to cutting, the line may be cut directly, independently of the orientation of a connection link. A connection link may for example be a chain link, a shackle or a master link.

In one embodiment, each of the guide pins, in an extended position, may have a tilted angle with regards to the deck. This may be achieved by having the guide pins skew mounted such that their longitudinal axis intersects in a point above deck between the guide pins. Having the guide pins skew mounted means that the distance between the upper ends decrease the more they are extended. The spacer may be mounted on an upper portion of the guide pins, such that only when the guide pins are fully extended the spacer will span the distance between the two guide pins. This way of arranging the guide pins does not require the guide pins or the spacer to be rotated to form an enclosure around a line. Guide pins of the prior art are arranged vertically and has to be rotated about their vertical axis to form a spacer between the guide pins.

The first guide pin may comprise a first spacer member and the second guide pin may comprise a second spacer member, wherein said spacer members may form a spacer between the guide pins opposite to the deck when said guide pins are in the extended position. When the guide pins are extended, the spacer member gets into contact with each other to form a spacer. The spacer creates distance between the guide pins while maintaining the enclosure around the line. The spacer reduces the risk of the line, particularly a chain, being jammed between the guide pins in the top of the enclosure.

The apparatus may be mounted in a body. The body may for example be mounted in the deck of the floating vessel, on the deck, or the structure underlying the deck may be the body such that each part of the apparatus may be incorporated in the underlying structure. In one embodiment, the body may be placed in a well in the deck and bolted to the surrounding structure.

The apparatus may comprise a centralizing device configured to align the line between the spacer and the cutting device, the centralizing device further being configured to move substantially vertical between a retracted position and at least one extended position, wherein the line is centered, by means of at least one actuator. The centralizer may be moveable between a retracted position and at least one extended position by means of at least one actuator, for example a hydraulic cylinder. In one embodiment, centralizing may be achieved by shaping the upper side of the centralizing device as a "V". In use, the centralizer may be extended up from the deck. The line will then be pushed upwards and the "V" shape makes the line slide towards the centre of the centralizer, the centre corresponding with the centre of the actuator and the spacer. The width of the centralizer may be greater than the largest internal distance between the two guide pins to ensure the line is caught by the centralizer when it is moved upwards. In a retracted position, the upper side of the centralizer do not protrude above deck level to ensure it does not interfere with the line running over.

The centralizer may comprise a slot for accommodating a vertical connection link on the line. In one embodiment, the slot may be located in the bottom of the "V" shape. In one embodiment, the slot may have a "U" shape. The slot may have a width such that a connection link, for example a chain link, shackle or master link, may slide into the slot in a vertical orientation. The next link on the line will typically have a horizontal orientation and will thus impinge against the centralizer. The centralizer may be used to secure or hold the line, similar to a shark jaw. A shark jaw is well known within field and will not be explained further.

The centralizer may further comprise a locking bolt moveable between an open and a closed position for stopping the vertical connection link from moving out of the slot when the locking bolt is in the closed position. The locking bolt may in one embodiment be positioned at the top of the slot or in the middle of the slot, to lock above or through the vertical connection link. Locking the line in the slot may be advantageous if for example the vessel is pitching, which may cause the line to become slack and potentially slide out of the slot.

The apparatus may comprise a hinged plate for covering a top side of the body, the hinged plate comprising openings for the cutting device, the guide pins and the centralizing device for them to, in use, extend through. The hinged plate may protect the apparatus from dirt and foreign objects. The openings provide a means for operating the different parts of the apparatus without having to open the plate. The plate may be hinged to the body or to the deck of the vessel. The plate may be flipped open to gain access to the different parts of the apparatus, for example for cleaning or maintenance. In a closed position, the plate may be flush with the deck to not constitute a trip hazard.

The hinged plate may further comprise at least one actuator for opening and closing of the hinged plate. The hinged plate may be too heavy to manually open or close. An actuator is thus a suitable embodiment for these operations. The actuator may for example be a hydraulic or pneumatic cylinder. A first end of the actuator may be fixed to the body, and a second end to the plate.

In a second aspect, the invention relates to a method for mechanical cutting of a line extending from a floating vessel by use of the apparatus, the method comprising a step of:
i. extending the guide pins to form an enclosure around the line, wherein the method further comprises the step of:
ii. cutting the line against the spacer using the cutting device without locking the line prior to cutting.

In one embodiment, the method, prior to step ii., may comprise a further step of:
iii. centralizing the line between the spacer and the cutting device using the centralizing device.

BRIEF DESCRIPTION OF THE DRAWINGS

In the following is described an example of a preferred embodiment illustrated in the accompanying drawings, wherein.

DETAILED DESCRIPTION OF THE DRAWINGS

Figure 1:
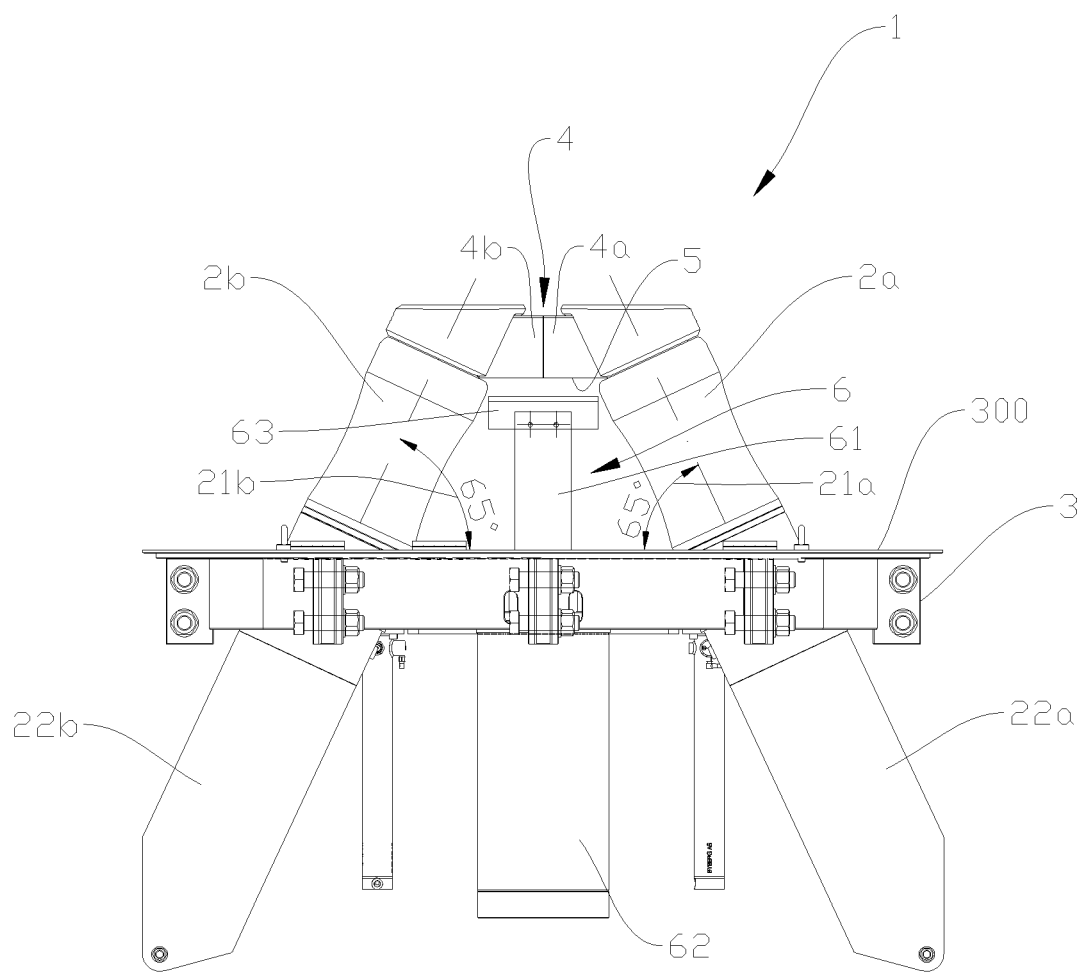
FIG. 1 shows a side view of an apparatus according to the invention.

FIG. 1 shows an apparatus 1 in accordance with one embodiment of the invention. The apparatus 1 is arranged in a body 3 for mounting in the deck 300 of a floating vessel (not shown). In another embodiment, the apparatus 1 may be mounted on the deck 300 of a floating vessel. In a third embodiment, the apparatus 1 may be incorporated in the deck 300 as individual parts without a body 3. Two guide pins 2a, 2b are positioned with a tilted angle 21a, 21b relative to the deck 300. It should be noted that the figures should not be seen as limiting with regards to the angle 21a, 21b of the guide pins 2a, 2b. Each of the guide pins 2a, 2b can move between a retracted and an extended position. The deck 300, the two guide pins 2a, 2b and a spacer 4 forming an enclosure around a line disposed between the guide pins 2a, 2b. The guide pins 2a, 2b are mounted in a guide pin housing 22a, 22b. In another embodiment, the guide pins 2a, 2b can be mounted without the guide pin housing 22a, 22b. The guide pin housing 22a, 22b comprises an actuator (not shown) arranged to displace the guide pins 2a, 2b. The guide pins 2a, 2b can be retracted in the guide pin housing 22a, 22b, see FIG. 2, wherein the top of the guide pins 2a, 2b do not protrude above deck 300 level.

FIG. 1 further shows the apparatus 1 comprising a cutting device 6. The cutting device 6 is placed between the two guide pins 2a, 2b. The cutting device 6 comprises an actuator 61, shown as a hydraulic cylinder. The hydraulic cylinder 6 is arranged substantially vertical in a cylinder housing 62. A cutting blade 63 is mounted on the upper end of the hydraulic cylinder 6. In an inoperative position, the cutting blade 63 is retracted in the cylinder housing 61, see FIG. 2, wherein the top of the cutting blade 63 do not protrude above deck 300 level. Spacer members 4a, 4b extents radially out from an upper portion of each guide pin 2a, 2b. When the guide pins 2a, 2b are fully extended, the two spacer members 4a, 4b joins to form a spacer 4 which bridges the distance between the guide pins 2a, 2b. The lower edge of the spacer 4 forms a reaction surface 5. In the event of cutting a line (not shown), the hydraulic cylinder 61 will extend towards the reaction surface 5, thus pressing the line between the cutting blade 63 and the reaction surface 5. The hydraulic cylinder 61 will apply sufficient pressure for the cutting blade 63 and the reaction surface 5 to break the line.

Figure 2:
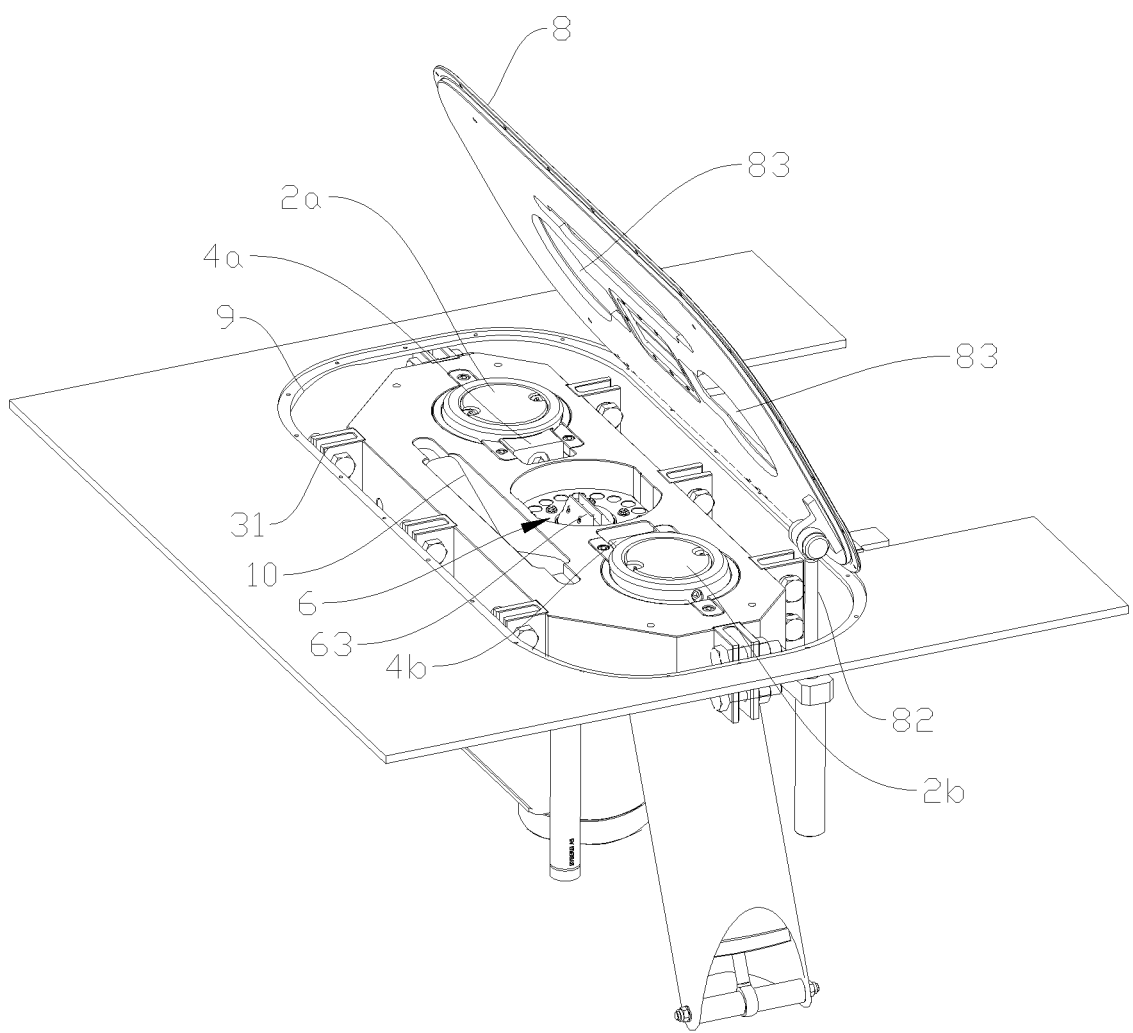
FIG. 2 shows an isometric view of the apparatus of FIG. 1, the hinged plate being opened and other parts in a retracted position.

FIG. 2 shows the guide pins 2a, 2b, the cutting device 6 and a centralizer 10 in the retracted position, and a plate 8 in an open position. The plate 8 is fixed to the deck 300 with three hinges 81, see FIG. 3 (only one hinge shown). The plate 8 can be opened and closed by an actuator 82, shown as a hydraulic cylinder. A body 3 is fixed to the surrounding deck structure 9 by means of eight bolted brackets 31.

Figure 3:
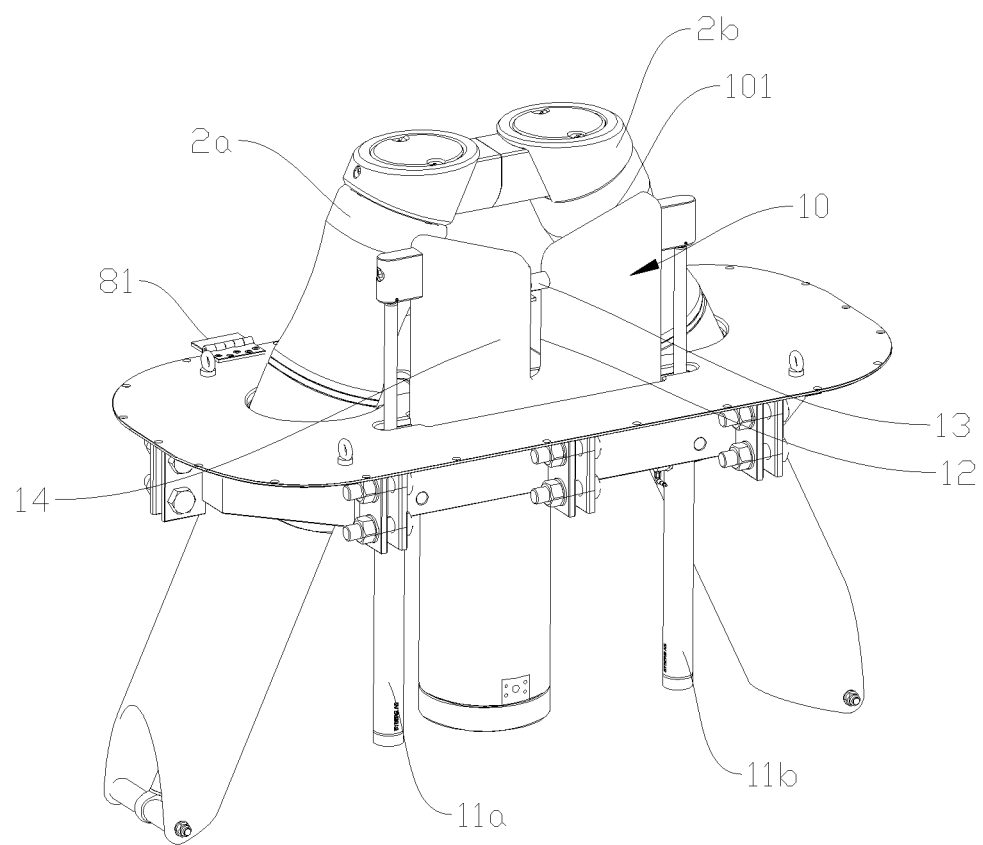
FIG. 3 shows another isometric view of the apparatus of FIG. 1, the two guide pins and the centralizer being fully extended.

FIG. 3 shows the guide pins 2a, 2b and the centralizer 10 in an extended position. The centralizer 10 can move substantially vertical by means of two actuators 11a, 11b, shown as hydraulic cylinders. The upper portion 101 of the centralizer 10 has a "V" shape to guide a line (not shown) towards the centre of the centralizer 10 when the centralizer 10 is moved upwards. The centralizer 10 has a width which is greater than the internal distance between the two guide pins 2a, 2b. This ensures that the line running between the two guide pins 2a, 2b are caught by the centralizer 10 as it moves upwards. The centralizer 10 has a slot 12 arranged to accommodate a vertically orientated connection link (not shown), e.g. a chain link, a shackle or a master link. The next connection link (not shown) on the line will typically have a horizontal orientation and will thus impinge against the face 14 of the centralizer 10. The slot 12 is arranged with a locking bolt 13 to restrict the line from sliding out of in the centralizer 10 slot 12. The locking bolt 13 can be moved between an open and a closed position by means of an actuator (not shown), for example a hydraulic cylinder, in the centralizer 10 body. In a closed position, the locking bolt 13 bridges a top portion of the slot 12.

It should be noted that the centralizer 10 is not required to cut a line.

It should also be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. An apparatus for cutting a line extending from a floating vessel having a deck, the apparatus comprising:
   two guide pins configured to move between a retracted position and an extended position, wherein a distance between the guide pins, in an extended position, is spanned by a spacer, the spacer forming a reaction surface;
   a cutting device mounted between the two guide pins, the cutting device being configured to move between a retracted position and an extended position,
   wherein the cutting device is arranged to perform a direct cut of the line against the reaction surface without holding the line prior to cutting such that the line may be cut directly independently of the orientation of the line.

2. The apparatus according to claim 1, wherein each of the guide pins in an extended position forms a tilted angle with regards to the deck.

3. The apparatus according to claim 1, wherein the first guide pin comprises a first spacer member and the second guide pin comprises a second spacer member, wherein said spacer members forms the spacer spanning the distance between the guide pins opposite to the deck when said guide pins are in the extended position.

4. The apparatus according to claim 1, wherein the apparatus is mounted in a body.

5. The apparatus according to claim 1, wherein the apparatus comprises a centralizing device arranged to align the line between the spacer and the cutting device, the centralizing device being configured to move between a retracted position and at least one extended position, wherein the line is centralized, by means of at least one actuator.

6. The apparatus according to claim 5, wherein the centralizing device comprises a slot for accommodating a vertical connection link on the line.

7. The apparatus according to claim 6, wherein the centralizing device comprises a locking bolt moveable between an open and a closed position for stopping the vertical connection link from moving out of the slot when the locking bolt is in the closed position.

8. The apparatus according to claim 5, wherein the apparatus comprises a hinged plate, the hinged plate comprising openings for the cutting device, the guide pins and the centralizing device for them to, in use, extend through.

9. The apparatus according to claim 8, wherein the hinged plate further comprises at least one actuator for opening and closing of the hinged plate.

10. A method for mechanical cutting of a line extending from a floating vessel by use of an apparatus comprising:

two guide pins configured to move between a retracted position and an extended position, wherein a distance between the guide pins, in an extended position, is spanned by a spacer, the spacer forming a reaction surface;

a cutting device mounted between the two guide pins, the cutting device being configured to move between a retracted position and an extended position, wherein the cutting device is arranged to perform a direct cut of the line against the reaction surface without holding the line prior to cutting such that the line may be cut directly independently of the orientation of the line;

the method comprising:

i. extending the guide pins to form an enclosure around the line, and ii. cutting the line against the spacer using the cutting device without holding the line prior to cutting such that the line is cut directly independently of the orientation of the line.

11. The method according to claim 10, wherein the method, prior to ii., comprises:

iii. centralizing the line between the spacer and the cutting device using a centralizing device.

* * * * *